United States Patent Office 3,036,615
Patented May 29, 1962

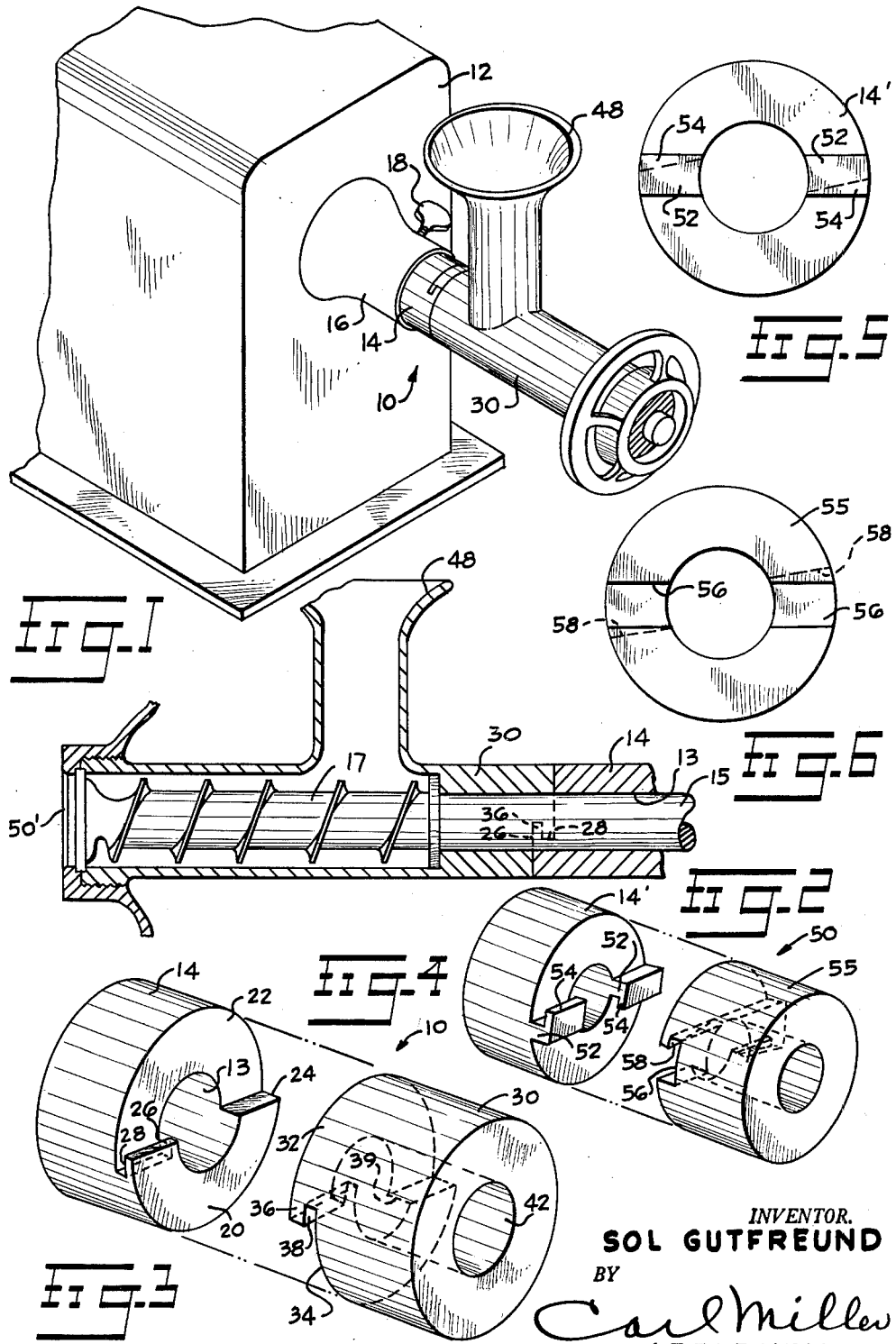

3,036,615
AUTOMATIC FOOD CHOPPER LOCK
Sol Gutfreund, 362 Hewes St., Brooklyn, N.Y.
Filed Jan. 19, 1960, Ser. No. 3,425
2 Claims. (Cl. 146—186)

This invention relates to meat processing equipment and, more particularly, to a safety device for a food chopper.

As is well known to those skilled in the art, the usual attachment of the chopper head to a stationary housing of a food chopping unit, such as a meat grinder, requires the manual manipulation and tightening of the parts which quite frequently become loose during the vibrating operation of the machine. This tendency to loosen not only presents a dangerous situation, but also entails a substantial amount of time and effort in applying and removing the various parts of the machine. It is therefore an object of the present invention to provide a positively acting safety locking device for mounting the chopping head of the meat grinder in place in an extremely simple and efficient manner, and which will overcome the aforementioned difficulties.

A further object of the present invention is to provide a safety locking device for meat grinders which does not require separate manipulation of the locking parts, but which will automatically become locked in place as soon as the meat chopper is energized.

An additional object of the present invention is to provide a safety locking device for meat grinders of the type described which can be readily installed in all types of food choppers at a relatively low cost.

All of the foregoing and still further objects and advantages of this invention will become apparent from a study of the following specification, taken in connection with the accompanying drawing, wherein:

FIGURE 1 is a perspective view of a food chopper having a locking device made in accordance with the present invention;

FIGURE 2 is a fragmentary longitudinal cross sectional view of certain parts of the assembly shown in FIGURE 1;

FIGURE 3 is an enlarged exploded perspective view of the interlocking elements of an assembly made in accordance with one form of the present invention;

FIGURE 4 is a view similar to FIGURE 3, of a slightly modified form of construction;

FIGURE 5 is a plan view of a bearing sleeve forming a part of the assembly shown in FIGURE 4; and FIGURE 6 is a plan view of a chopper head forming another part of the assembly shown in FIGURE 4.

Referring now to the drawing, and more particularly to FIGURES 1 to 3 thereof, an assembly 10 made in accordance with one form of the present invention is shown in operative association with a food chopping machine 12 having a housing portion 14 partially enclosed by a sleeve 16 mounted thereupon by means of a thumb screw 18. The mounting head portion 14 is provided with a longitudinal bore 13 within which a drive shaft 15 is rotatably supported for operating the auger 17 of the meat grinder.

The free end of the extension 14 is provided with a substantially semi-circular projection 20 that projects outwardly from the free end 22 thereof. One side of the projection 20 is provided with a flange 26 that defines a recess 28, whereas the diametrically opposite side of the projection defines an abutment surface 24.

The bearing sleeve 30 of the food hopper 48 also includes a longitudinal bore 42 within which the drive shaft is rotatably received. The free end 34 of the bearing sleeve 30 is provided with a substantially semi-circular projection 32 having a flange 36 at one end defining a recess 38, whereas the opposite end thereof defines a substantially flat abutment surface 39. It will now be recognized that by placing the free end of the bearing sleeve 30 in contact with the free end of the extension 14, and rotating such bearing sleeve 30 in one direction, that the flange 36 will lock within the recess 28 of the extension 14, whereas the flange 26 of the extension 14 will lock within the recess 38 of the bearing sleeve. The parts are so orientated that the locking direction of the parts corresponds to the direction of rotation of the feed auger 17, which forces the food outwardly from the hopper 48 through the discharge end 50' of the chopper head. Therefore, the energization of the chopper machine 12, with the bearing sleeve in contact with the extension 14, automatically effects rotation of the interlocking parts to the locked position, thus preventing loosening or disengagement thereof.

Reference is now made to FIGURES 4, 5, and 6 of the drawing, which illustrate a slightly modified form of construction 50, wherein the housing extension 14' is provided with a pair of diametrically opposite and longitudinally outwardly extending projections 52, each of which is provided with a terminal flange 54 extending in arcuately similar directions. The bearing sleeve 55 is provided with a diametrically extending slot 56, which is further recessed at diametrically opposite and arcuately similar sides 58, for receiving the projections 52 and locking flanges 54, respectively, therewithin. It will thus be recognized that upon insertion of the projections 52 into the enlarged diametrically extending slot 56 of the bearing sleeve 55, energization of the chopping machine will effect rotation of the bearing sleeve 55 into locking engagement with the extension 14', thus locking the parts in place in the manner hereinbefore described.

It will also be noted that upon engagement of the interlocking parts of the present invention, the parts are rotatably and axially locked against relative rotation so long as the machine remains energized, thus positively preventing disassembly of the parts during use. Of course, in the embodiment illustrated in FIGURES 4 to 6 of the drawing, the diametrically extending slot 56 is wide enough to accommodate the projections 52 and flanges 54 axially therewithin, following which rotation of the parts causes the flanges 54 to be received within the recesses 58.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. In a food chopper having a stationary housing and a chopper head with a rotatably supported feeder auger for chopping food supplied thereto, detachable mounting means releasably securing said chopper head upon said housing comprising, in combination, a bearing sleeve integral with one end of said chopper head, an outwardly opening socket in said housing receiving portions of said bearing sleeve therewithin, circumferentially acting interlocking means carried by said bearing sleeve and said housing releasably securing said bearing sleeve within in said socket, said interlocking means being normally rotatable to a released position and rotatable to a locked position in response to actuation of said auger, said interlocking means comprising at least one radially extending portion projecting longitudinally outwardly from one end of said bearing sleeve and receivable within said socket, said radially extending portion having a lug, and said socket of said housing having a circumferentially extending recess receiving said lug therewithin in response to said rotation of said bearing sleeve to said locked position, said interlocking means comprising a pair of diametrically oppositely disposed radially extending portions projecting outwardly from said one end of said bearing sleeve, said socket including a pair of diametrically oppositely extending circumferentially extending recesses receiving said lugs therewithin, and said pair of diametrically oppositely disposed radially extending portions projecting longitudinally outwardly from said one end of said bearing sleeve substantially the same amount.

2. In a meat chopper as set forth in claim 1, wherein said recesses are substantially larger than said pair of diametrically oppositely disposed radially extending portions for axially and rotatably receiving said radially extending portions therewith.

References Cited in the file of this patent

UNITED STATES PATENTS

| | | |
|---|---|---|
| 1,191,313 | Johnston | July 18, 1916 |
| 1,780,914 | Gullberg | Nov. 11, 1930 |
| 1,853,578 | Ross | Apr. 12, 1932 |